(12) United States Patent
Caccamo et al.

(10) Patent No.: US 10,846,251 B1
(45) Date of Patent: *Nov. 24, 2020

(54) SCRATCHPAD-BASED OPERATING SYSTEM FOR MULTI-CORE EMBEDDED SYSTEMS

(71) Applicant: The Board of Trustees of the University of Illinois, Urbana, IL (US)

(72) Inventors: Marco Caccamo, Urbana, IL (US); Rodolfo Pellizzoni, Waterloo (CA); Renato Mancuso, Urbana, IL (US); Rohan Tabish, Urbana, IL (US); Saud Wasly, Jeddah (SA)

(73) Assignee: The Board of Trustees of the University of Illinois, Urbana, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/840,005

(22) Filed: Apr. 3, 2020

Related U.S. Application Data

(63) Continuation of application No. 15/639,666, filed on Jun. 30, 2017, now Pat. No. 10,649,914.

(Continued)

(51) Int. Cl.
*G06F 3/06* (2006.01)
*G06F 13/28* (2006.01)
(Continued)

(52) U.S. Cl.
CPC .............. *G06F 13/28* (2013.01); *G06F 3/061* (2013.01); *G06F 3/0656* (2013.01);
(Continued)

(58) Field of Classification Search
None
See application file for complete search history.

(56) References Cited

U.S. PATENT DOCUMENTS 5,918,064 A * 6/1999 Miller ................... G06F 13/124
712/38
7,743,191 B1 6/2010 Liao
(Continued)

FOREIGN PATENT DOCUMENTS

| JP | 03-282903 | 12/1991 |
| JP | 2001-075822 | 3/2001 |
| JP | 2012-155523 | 8/2012 |

OTHER PUBLICATIONS

'A Reliable and Predictable Scratchpad-Centric OS for Multi-Core Embedded Systems' by Rohan Tabish et al., copyright 2017, IEEE. (Year: 2017).*

(Continued)

*Primary Examiner* — Steven G Snyder
(74) *Attorney, Agent, or Firm* — McDonnell Boehnen Hulbert & Berghoff LLP

(57) ABSTRACT

An embodiment may involve determining that a first logical partition of a scratchpad memory coupled to a processor core is empty and a first application is scheduled to execute; instructing a direct memory access (DMA) engine to load the first application into the first logical partition and then instructing the processor core to execute the first application from the first logical partition; while the first application is being executed from the first logical partition, determining that a second logical partition of the scratchpad memory is empty and a second application is scheduled to execute; instructing the DMA engine to load the second application into the second logical partition; determining that execution of the first application has completed; and instructing the DMA engine to unload the first application from the first logical partition and instructing the processor core to execute the second application from the second logical partition.

20 Claims, 9 Drawing Sheets

Related U.S. Application Data

(60) Provisional application No. 62/357,426, filed on Jul. 1, 2016.

(51) Int. Cl.
    *G06F 13/16*     (2006.01)
    *G06F 9/50*      (2006.01)

(52) U.S. Cl.
    CPC .......... *G06F 3/0683* (2013.01); *G06F 9/5077* (2013.01); *G06F 13/1673* (2013.01)

(56) References Cited

U.S. PATENT DOCUMENTS

| | | |
|---|---|---|
| 2005/0060510 A1 | 3/2005 | Perez |
| 2006/0059286 A1* | 3/2006 | Bertone .............. G06F 9/30014 710/260 |
| 2006/0059310 A1* | 3/2006 | Asher ................. G06F 12/0875 711/126 |
| 2012/0151502 A1 | 6/2012 | Kang et al. |
| 2013/0055277 A1 | 2/2013 | Ashish et al. |

OTHER PUBLICATIONS

'An FPGA based Configurable I/O System for AC Drive Controllers' by D.R. Woodward et al., copyright 1994, IEEE. (Year: 1994).*

'CRM: Configurable Range Memory for Fast Reconfigurable Computing' by Jongkyung Paek et al., 2011 IEEE International Parallel & Distributed Processing Symposium. (Year: 2011).*

Bai et al., "CMSM: An Efficient and Effective Code Management for Software Managed Multicores," 2013 International Conference on Hardware/Software Codesign and System Synthesis (CODES+ISSS), IEEE, 2013, pp. 1-9.

Betti et al., "Real-time I/O Management System with COTS Peripherals," IEEE Transactions on Computers, Jan. 2013, pp. 45-58, vol. 62, No. 1.

Bui et al., "Temporal Isolation on Multiprocessing Architectures," In Design Automation Conference (DAC), Jun. 2011, pp. 274-279.

Chattopadhyay et al., "Time-Predictable Embedded Software on Multi-Core Platforms: Analysis and Optimization," Foundations and Trends in Electronic Design Automation, Jul. 2014, pp. 199-356, vol. 8, No. 4-3.

Deverge et al., "WCET-Directed Dynamic Scratchpad Memory Allocation of Data," 19th Euromicro Conference on Real-Time Systems, ECRTS'07, 2007, pp. 179-190.

Durrieu et al., "Predictable Flight Management System Implementation on a Multicore Processor," ERTSS'14, 2014, 9 pages.

FAA position paper on Multi-core Processors, CAST32 (rev 0). http://www.faa.gov/aircraft/aircert/designapprovals/airsoftware/cast/castpapers/media/cast32.pdf. Accessed: Jan. 26, 2015, 23 pages.

Falk et al, "Optimal Static WCET-aware Scratchpad Allocation of Program Code," Proceedings of the 46th Annual Design Automation Conference, ACM, 2009, pp. 732-737.

Gatti et al., "Ensuring robust partitioning in multicore platforms for IMA systems," Conference on Digital Avionics Systems (DASC), 2012 IEEE/AIAA 31st, 18 pages.

Girbal et al., "Deterministic Platform Software for Hard Real-Time Systems using Multi-Core COTS," Conference on Digital Avionics Systems (DASC), 2015 IEEE/AIAA 34th, IEEE, 2015, 16 pages.

Li et al., "Memory Coloring: A Compiler Approach for Scratchpad Memory Management," 14th International Conference on Parallel Architectures and Compilation Techniques, IEEE 2005, pp. 329-338.

Lu et al., "SSDM: Smart Stack Data Management for Software Managed Multicores (SMMs)," Proceedings of the 50th Annual Design Automation Conference, ACM, 2013, 8 pages.

Mancuso et al., "WCET(m) Estimation in Multi-Core Systems using Single Core Equivalence," 27th Euromicro Conference on Real-Time Systems (ECRTS), Jul. 2015, pp. 174-183.

Mancuso et al., "Real-Time Cache Management Framework for Multi-Core Architectures," 19th Real-Time and Embedded Technology and Applications Symposium (RTAS), IEEE, 2013, pp. 45-54.

Metzlaff et al., "A Dynamic Instruction Scratchpad Memory for Embedded Processors Managed by Hardware," In Architecture of Computing Systems—ARCS, Springer, 2011, pp. 122-134.

Pellizzoni et al., "A Predictable Execution Model for COTS-based Embedded Systems," 17th IEEE Real-Time and Embedded Technology and Applications Symposium, RTAS '11, Washington, DC, USA, 2011, IEEE Computer Society, pp. 269-279.

Puaut et al., "Scratchpad memories vs locked caches in hard real-time systems: a quantitative comparison," In Design, Automation & Test in Europe Conference & Exhibition, 2007 Date'07, IEEE, pp. 1-6.

Sebexen et al., "Software Techniques for Scratchpad Memory Management," MEMSYS '15, Oct. 5-8, 2015, Washington DC, ACM, 5 pages, http://memsys.io/wp-content/uploads/2015/09/p98-sebexen.pdf. Accessed: Jan. 26, 2015.

Suhendra et al., "Scratchpad Allocation for Concurrent Embedded Software," ACM Transactions on Programming Languages and Systems (TOPLAS), 2010, 6 pages, vol. 32, No. 4.

Tabish et al., "A Real-Time Scratchpad-centric OS for Multi-core Embedded Systems," Proceedings of the 22nd IEEE Real-Time and Embedded Technology and Applications Symposium (RTAS), Apr. 2016, 124 pages.

Takase et al., "Partitioning and Allocation of Scratch-Pad Memory for Priority-Based Preemptive Multi-Task Systems," Europe Conference & Exhibition on Design, Automation & Test, IEEE, 2010, pp. 1124-1129.

Ungerer et al., "MERASA: Multicore Execution of Hard Real-Time Applications Supporting Analyzability," IEEE Micro, 2010, pp. 66-75, vol. 30, No. 5.

Wasly et al., "Hiding Memory Latency Using Fixed Priority Scheduling," 20th Real-Time and Embedded Technology and Applications Symposium (RTAS), IEEE, 2014, pp. 75-86.

Wasly, Saud, "A Dynamic Scratchpad Memory Unit for Predictable Real-Time Embedded Systems," 25th Euromicro Conference on Real-Time Systems (ECRTS), IEEE, 2013, pp. 183-192.

Whitham et al., "Investigation of Scratchpad Memory for Preemptive Multitasking," 33rd Real-Time Systems Symposium (RTSS), IEEE, 2012, pp. 3-13.

Whitham et al., "Explicit Reservation of Local Memory in a Predictable, Preemptive Multitasking Real-Time System," 18th Real-Time and Embedded Technology and Applications Symposium (RTAS), IEEE, 2012, pp. 3-12.

Wilding et al., "Invariant Performance: A Statement of Task Isolation Useful for Embedded Application Integration," Dependable Computing for Critical Applications, IEEE, 1999, pp. 287-300.

Wolf et al., "RTOS Support for Parallel Execution of Hard Real-Time Applications on the MERASA Multicore Processor," 13th IEEE International Symposium on Object/Component/Service-Oriented Real-Time Distributed Computing (ISORC), IEEE 2010, pp. 193-201.

Yun et al., "Memguard: Memory Bandwidth Reservation System for Efficient Performance Isolation in Multi-Core Platforms," 19th Real-Time and Embedded Technology and Applications Symposium (RTAS), IEEE, 2013, pp. 55-64.

Yun et al., "PALLOC: DRAM Bank-Aware Memory Allocator for Performance Isolation on Multicore Platforms," 20th Real-Time and Embedded Technology and Applications Symposium (RTAS), IEEE, 2014, pp. 155-166.

Alhammad et al., "Memory Efficient Global Scheduling of Real-time Tasks", IEEE, 2015, 285-296.

Wasly, "A Dynamic Scratchpad Memory Unit for Predictable Real-Time Embedded Systems", thesis presented to the University of Waterloo, 2012, 69 pages.

Kalokerinos et al., "FPGA Implementation of a Configurable Cache/Scratchpad Memory with Virtualized User-Level RDMA Capability", IEEE, 2009, 149-156.

(56) References Cited

OTHER PUBLICATIONS

Wang et al., "Dynamic Management of Scratchpad Memory Based on Compiler Driven Approach", IEEE, 2010, 668-372.

* cited by examiner

SCRATCHPAD-BASED OPERATING SYSTEM FOR MULTI-CORE EMBEDDED SYSTEMS

CROSS-REFERENCE TO RELATED APPLICATIONS

This application claims priority to and is a continuation of U.S. patent application Ser. No. 15/639,666, filed Jun. 30, 2017, which is hereby incorporated by reference in its entirety.

U.S. patent application Ser. No. 15/639,666 claims priority to U.S. provisional patent application No. 62/357,426, filed Jul. 1, 2016, which is hereby incorporated by reference in its entirety.

STATEMENT REGARDING FEDERALLY-SPONSORED RESEARCH OR DEVELOPMENT

This invention was made with government support under CNS1219064 and CNS1302563 awarded by National Science Foundation. The government has certain rights in the invention.

BACKGROUND

Multi-core embedded systems are mainstream products. Multi-core chips allow different processing tasks to execute in parallel while accessing a set of shared hardware resources, including main memory, buses, caches, and input/output (I/O) peripherals. Unfortunately, when one or more of these resources is utilized to its saturation point, severe and unpredictable inter-core interference can heavily impact the system's behavior. Thus, unregulated contention of shared resources induces significant execution time variance. Hence, specific mechanisms to manage and schedule access to shared resources should be designed and validated.

This problem has been approached from different perspectives such as new multi-core hardware platforms, as well as new operating system techniques involving shared resource partitioning and management on commercial-off-the-shelf (COTS) hardware platforms. While a pure hardware solution might be desirable to meet the needs of modern real-time systems, it is not viable in the short term. Conversely, enforcing schedule determinism in software on a general-purpose COTS architecture may sacrifice performance for temporal predictability of task execution.

Modern real-time operating systems were designed for single-core platforms, where the use of real-time scheduling policies, efficient inter-process communication, and prioritized interrupt handling were enough to ensure temporal predictability. Support for multi-core platforms was later introduced without a substantial change in design, resulting in a new set of challenges (mainly related to shared hardware resource management) when trying to achieve temporal predictability on multi-core systems.

SUMMARY

The embodiments herein introduce a set of operating system features designed to achieve temporal predictability on multi-core systems. To do so, the design leverages core specialization and low-level resource management policies in a scratchpad-based scheduling mechanism with schedule-aware I/O. Advantageously, the response time of real-time tasks under the proposed scheduling strategy can be readily predicted. A full implementation of the proposed operating system has been performed using a commercially available multi-core micro-controller. Its design has been validated using a combination of synthetic tasks and established benchmarks.

Particularly, the embodiments involve embedded scratchpad-based multi-core systems. Scratchpad memories tend to provide better temporal isolation when compared to traditional caches. The embodiments also involve separate I/O and memory buses, dual-port memories with direct memory access (DMA) support, and core specialization. The disclosed scratchpad-based operating system may provide predictability for hard real-time applications on multi-core embedded systems. In order to achieve this goal, resource specialization, high-level scheduling of shared hardware resources, and a three-phase task execution model are employed.

Compared to some prior techniques, the embodiments herein differ in at least three ways. First, they are not focused exclusively on scratchpad management, and instead integrate a scratchpad within an overall operating system design. Second, a new operating system design is implemented on a COTS microcontroller. Third, conflicts between I/O traffic issued by different cores are mitigated.

A first example embodiment may involve an application processor core coupled to an application scratchpad memory and configured to execute applications stored in the application scratchpad memory. The first example embodiment may also involve a main memory, a direct memory access (DMA) engine, and a data bus communicatively connecting the application processor core, the application scratchpad memory, the main memory, and the DMA engine. An operating system may be configured to perform operations comprising: determining that a first logical partition of the application scratchpad memory is empty and a first application stored in the main memory is scheduled to execute; possibly in response to determining that the first logical partition of the application scratchpad memory is empty and the first application stored in the main memory is scheduled to execute, instructing the DMA engine to load the first application from the main memory into the first logical partition and then instructing the application processor core to execute the first application from the first logical partition; while the first application is being executed from the first logical partition, determining that a second logical partition of the application scratchpad memory is empty and a second application stored in the main memory is scheduled to execute; possibly in response to determining that the second logical partition of the application scratchpad memory is empty and the second application is scheduled to execute, instructing the DMA engine to load the second application from the main memory into the second logical partition; determining that execution of the first application has completed; and possibly in response to determining that execution of the first application has completed, instructing the DMA engine to unload the first application from the first logical partition to the main memory and instructing the application processor core to execute the second application from the second logical partition.

In a second example embodiment, an article of manufacture may include a non-transitory computer-readable medium, having stored thereon program instructions that, upon execution by a computing device, cause the computing device to perform operations in accordance with the first example embodiment.

In a third example embodiment, an operating system may be configured to perform operations in accordance with the first example embodiment.

In a fourth example embodiment, a system may include various means for carrying out each of the operations of the first example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Herein the term "core" may refer to any central processing unit (CPU), processor, microprocessor, or micro-controller entity that is capable of executing program instructions and manipulating data. In some embodiments, a single CPU or processor may contain more than one core, thus forming a multi-core processor. Therefore, the terms "core", "processor", "multi-processor", "processor core", "application processor core", "I/O core", and others may refer to the same element, depending on context.

Herein the term "task" may refer to any software or firmware application, process, thread, or group of one or more of such applications, processes, or threads. In some instances, the term "task" may be used interchangeably with the term "application". Execution instances of the same task may be individually scheduled, and these instances may be referred to as "jobs". Thus, the same task may execute several times as distinct jobs on the same or different partitions of a core (or even on different cores).

1. SYSTEM

This section summarizes the task model and the hardware assumptions for the design of a scratchpad-based operating system with temporal predictability. In such a system, task scheduling and performance analysis are simplified because the amount of time required for each task to execute in whole or in discrete phases is readily predictable.

Figure 1:
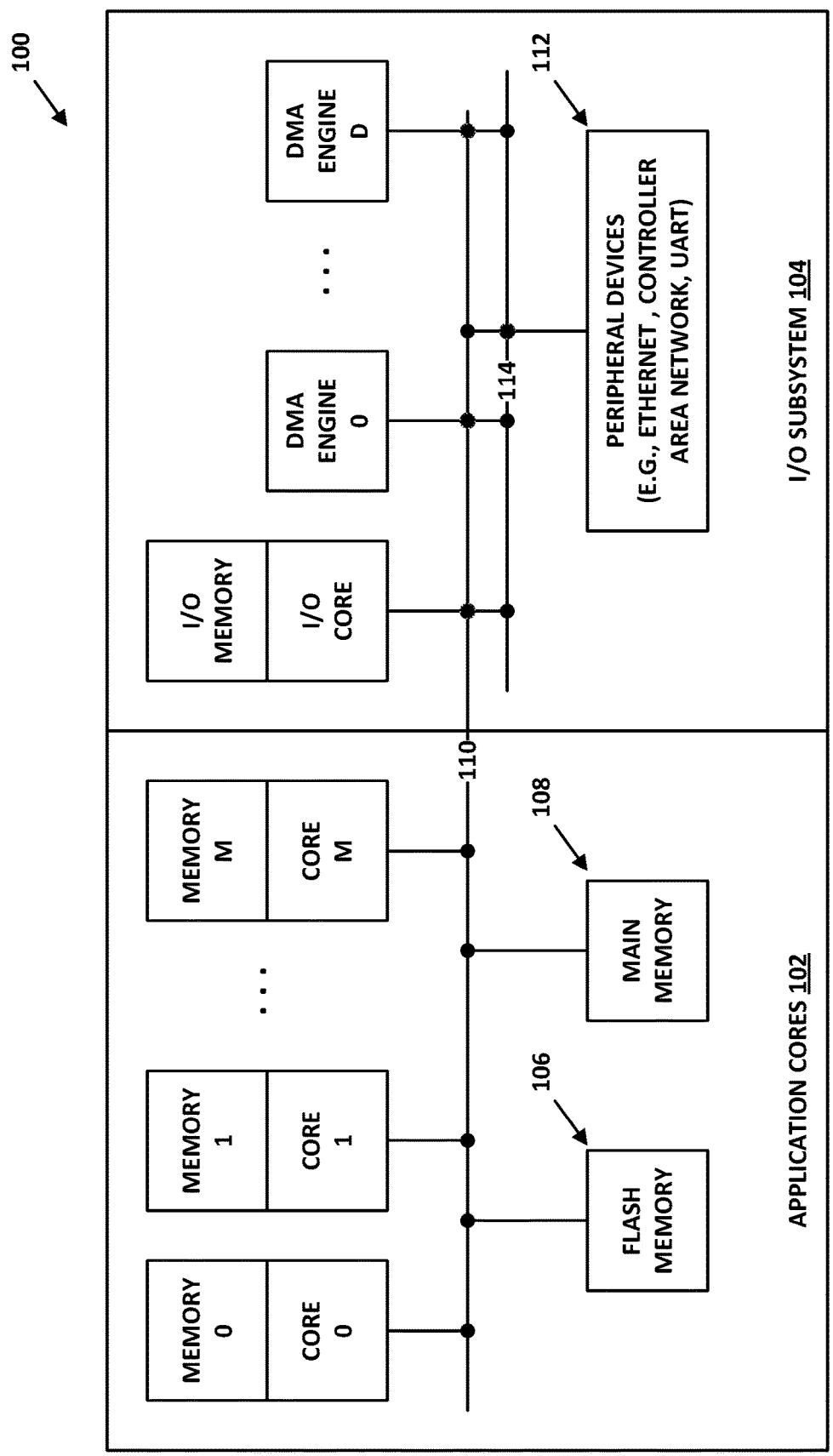
FIG. 1 depicts a multi-core architecture, according to an example embodiment.

FIG. 1 illustrates an example multi-core system 100 in accordance with example embodiments. System 100 includes application cores 102 and I/O subsystem 104. Application cores 102 include M+1 cores, each with dedicated scratchpad memory. These cores and memories are coupled to flash memory 106 and main memory 108 by way of bus 110. Flash memory 106 may be non-volatile memory that stores program instructions that the cores of system 100 can execute to carry out operating system and task procedures.

I/O subsystem 104 includes an I/O core with dedicated scratchpad I/O memory, as well as D+1 DMA engines (where D≥0). These components may be coupled to peripheral devices 112 by way of bus 114. The DMA engines may be configured to move or copy sections of main memory 108 to any of the scratchpad memories, or vice versa. These DMA operations may be performed without requiring processing from any of the cores. Peripheral devices 112 may include any device connected to system 100, such as Ethernet devices, controller area network devices, universal asynchronous receiver/transmitter (UART) devices, and so on.

Bus 110 and bus 114 may be physically separate busses that operate independently from one another. Each of these busses may represent multiple physical or logical busses for purposes of increased performance and redundancy. In some embodiments, bus 114 may be dedicated to I/O operations involving the I/O core, I/O memory, DMA engines, and/or peripheral devices 112.

The following subsections describe the design and capabilities of system 100 in more detail.

A. Scratchpad Memories

Each core in system 100 features a block of dedicated scratchpad memory. The size of each per-core scratchpad memory is large enough to fully contain the footprint of any two tasks executed by system 100. Hence, the footprint of the largest task executed by system 100 is at most half the size of a scratchpad memory.

Although this feature may appear restrictive, modern scratchpad-based micro-controllers provide scratchpad memories that have a size in the same order of magnitude as the main memory. For instance, in the NXP® MPC5777M, each core includes 80 KB of scratchpad memory with a total main memory size of about 400 KB. Further, hard real-time control tasks typically are compact in terms of memory size. Additionally, if a task violates this size constraint, known methodologies exist to split a large task into smaller sub-tasks that are individually compliant with the imposed constraint.

An alternative, yet logically equivalent, organization of system 100 includes M+1 cores but only one block of scratchpad memory that can be concurrently accessed by the M+1 cores. For instance in the TI® C66x micro-processor family, each application core includes 512 KB of scratchpad memory that can be configured and accessed as a shared scratchpad memory of 4 MB in size.

As discussed in more detail below, before tasks can be executed from a scratchpad memory, their code and data need to be transferred from main memory 108. Thus, a task model has three phases: a load phase, an execution phase, and an unload phase. During the load phase, the code and data image for the activated task is copied from main memory 108 to a scratchpad memory. During the execution phase, the loaded task executes on the core associated with the scratchpad memory by relying on in-scratchpad data. During the unload phase, the portion of data that has been modified and needs to remain persistent across subsequent activations of the task is written back to main memory 108.

Although the three phases of a task should be performed in the described order, there is no restriction on the timing between any two phases of the same task. Additionally, if the application justifies it, the unload phase can be skipped, or intermediate load and unload phases can be performed throughout the execution of a task.

B. DMA Engines

To avoid stalling a core when load or unload operations are performed, copy operations to and/or from the scratch-pad memories can proceed in parallel with task execution. This can be achieved as long as execution and load/unload phases belong to two distinct tasks. In order to parallelize load/unload operations with task execution, the DMA engines can be used. Particularly, the DMA engines are able to transfer data from the main memory 108 into the I/O scratchpad memory and vice versa. By employing the capability of parallelizing load/unload operations together with task execution, with the principle that any task image can fit in half of a scratchpad memory, it is possible to hide task loading/unloading overhead during task execution.

C. Dedicated I/O Bus

Since the activity of peripheral devices 112 is typically triggered by external events, it is inherently asynchronous. Unfortunately, unregulated/O activity on bus 110 can lead to unpredictable contention with core activity. Such un-arbitrated/O traffic represents one of the major sources of unpredictability in real-time systems. To mitigate conflicts caused by the inherently asynchronous activity of I/O devices, bus 114 routes I/O traffic without directly interfering with core-originated memory traffic.

Furthermore, traffic transmitted over bus 114 may need to be handled, pre-processed, and scheduled before reaching application cores 102. Thus, the I/O core exists to manage these activities. Like application cores 102, the I/O core features a scratchpad I/O memory that is used to buffer I/O data before this data is delivered to tasks.

Typically, peripheral devices 112 that support high-bandwidth operations are DMA-capable. Slower devices expose memory mapped input/output buffers that can also be read/written using generic platform DMA engines. Thus, I/O data transfers to and/or from an I/O core can be performed by the DMA engines, and the data from peripheral devices 112 can be directly transferred into the scratchpad I/O memory. Peripheral devices 112 are not allowed to initiate asynchronous transfers directly into main memory 108. This design choice allows co-scheduling of core and I/O activities to achieve higher temporal predictability in the system.

D. Memory Organization

As micro-controllers evolve into complex multi-core systems, more advanced support of memory protection schemes may be provided. Memory management unit (MMU) support allows for a straightforward implementation of task relocation by relying on page table manipulation. Usually, systems without MMU support include a memory protection unit (MPU). MPUs support the definition of per-core access permissions based on linear ranges of physical memory addresses.

For the embodiments herein, no specific assumption needs to be made about memory protection features of system 100. Hence, the presence of an MMU is not a requirement. Indeed, task relocation from main memory 108 to scratchpad memories can be achieved without MMU support. Although they are not necessary to implement the embodiments herein, MPUs can be easily supported within these embodiments.

E. Task Model

In system 100, scheduling decisions (e.g., what task is to be executed next) are made according to a policy that can be local to the cores or globally defined. Depending on the adopted scheduling strategy, load, execute, and unload phases may be queued and performed accordingly.

As one possible example, system 100 can use a partitioned and fixed priority scheduling policy. Herein, the partitioning of tasks refers to each task being assigned to a specific core. Further, each core may have at least two logical partitions, in each of which tasks may execute independently, but not simultaneously. Thus, the behavior and/or misbehavior of a task should not affect the execution of another executing on a separate partition of the core. In each core, inter-partition isolation can be achieved by employing time division multiplexing and fault containment strategies. In some embodiments, more than two partitions may be used.

Thus, each core has a set $\Gamma$ of N sporadic tasks, where $\Gamma=\{\tau_1, \ldots \tau_N\}$. Furthermore, each task potentially has a different priority, where $\tau_1$ has the highest priority and $\tau_N$ has the lowest priority. The deadline of each task is assumed to be less than or equal to its minimum inter-arrival time (MIT) if the task is periodic. As introduced above, tasks follow a three phase model. Hence, to satisfy temporal constraints, the last phase of a task (unload) needs to complete before its associated deadline.

The following terms are used to specify task parameters from a particular task $\tau_i$. The task's MIT (if periodic) is $\tau_i \cdot T$. The task's execution time, including all overhead is $\tau_i \cdot c$, where $c<T$. The time-division multiplex slot size of DMA operations is $\sigma$.

2. OPERATING SYSTEM DESIGN

One aspect of the proposed scratchpad-memory-based operating system is resource specialization. As previously mentioned, a specialized I/O core and I/O bus are used to handle peripheral traffic. Similarly, a specific role is assigned to different memory resources in the system. Particularly, three types of memory resources exist, as depicted in FIG. 1. First, flash memory 106 is used to persistently store application and/or operating system code, read-only data, as well as initialization values of read-write portions of main memory. Second, main memory 108 contains writable application and system data that represent the time-variant state of the system. Finally, scratchpad memories temporarily store a copy of code and data images for those tasks that are currently being scheduled for execution.

In some embodiments, applications are not executed directly from main memory 108. Instead, the following strategy is employed: (1) task images are permanently stored in flash memory 106 and loaded into main memory 108 at system boot; (2) a dedicated DMA engine is used to move task images to and from scratchpad memory; (3) a secondary DMA engine is used to perform I/O data transfers between devices and the I/O core; (4) tasks execute from scratchpad memory; and (5) only task-relevant I/O data are transferred upon task load from the I/O subsystem.

The benefit of this design is twofold. First, it allows high-level scheduling of accesses to main memory 108, ultimately achieving conflict-free execution of tasks from local memories. Second, performance benefits derived from the usage of fast scratchpad memories are exploited, ultimately combining better performance with higher temporal determinism.

The capability to dynamically move application tasks in and out of scratchpad memories may be referred to as supporting relocatable tasks. As mentioned above, if hardware MMU support exists, task relocation can be achieved using page table manipulation. Otherwise, advanced compiler level techniques can be exploited to generate position independent code, as described below.

In the proposed scratchpad-based operating system, a DMA engine is used to position the image of a relocatable task inside a scratchpad memory for execution. We refer to this DMA engine as application DMA. Similarly, we refer to the platform DMA used for I/O transfers as peripheral DMA. Typically, a single DMA engine is capable of utilizing the full main memory bandwidth in micro-controller platforms. Nonetheless, the design constraint that imposes the use of a single application DMA can be relaxed if the main memory subsystem allows two or more DMA engines to transfer data concurrently without saturating the main memory bandwidth.

Load/unload operations for tasks running on the M+1 application cores may be serialized to prevent unregulated contention over the bus 110. Hence, only a single DMA engine is required as the application DMA for all the application cores. Several schemes are known to fairly share a single resource across different consumers. In some embodiments, a time division multiple access (TDMA) mechanism is employed to serialize task load/unload operations among the application cores. An advantage of the TDMA mechanism lies in its simplicity of implementation. Although the discussion herein is focused on TDMA-based sharing of the application DMA engine, the proposed operating system can be extended to consider round-robin policies as well as budget-based schemes.

In order to perform TDMA-based scheduling of the application DMA engine, time is partitioned into slots of fixed size. In each slot, only a single DMA operation can be performed, either a task load or unload. The slot size is chosen to ensure that the task with the largest footprint in the system can be loaded within the slot time window.

Figure 2:
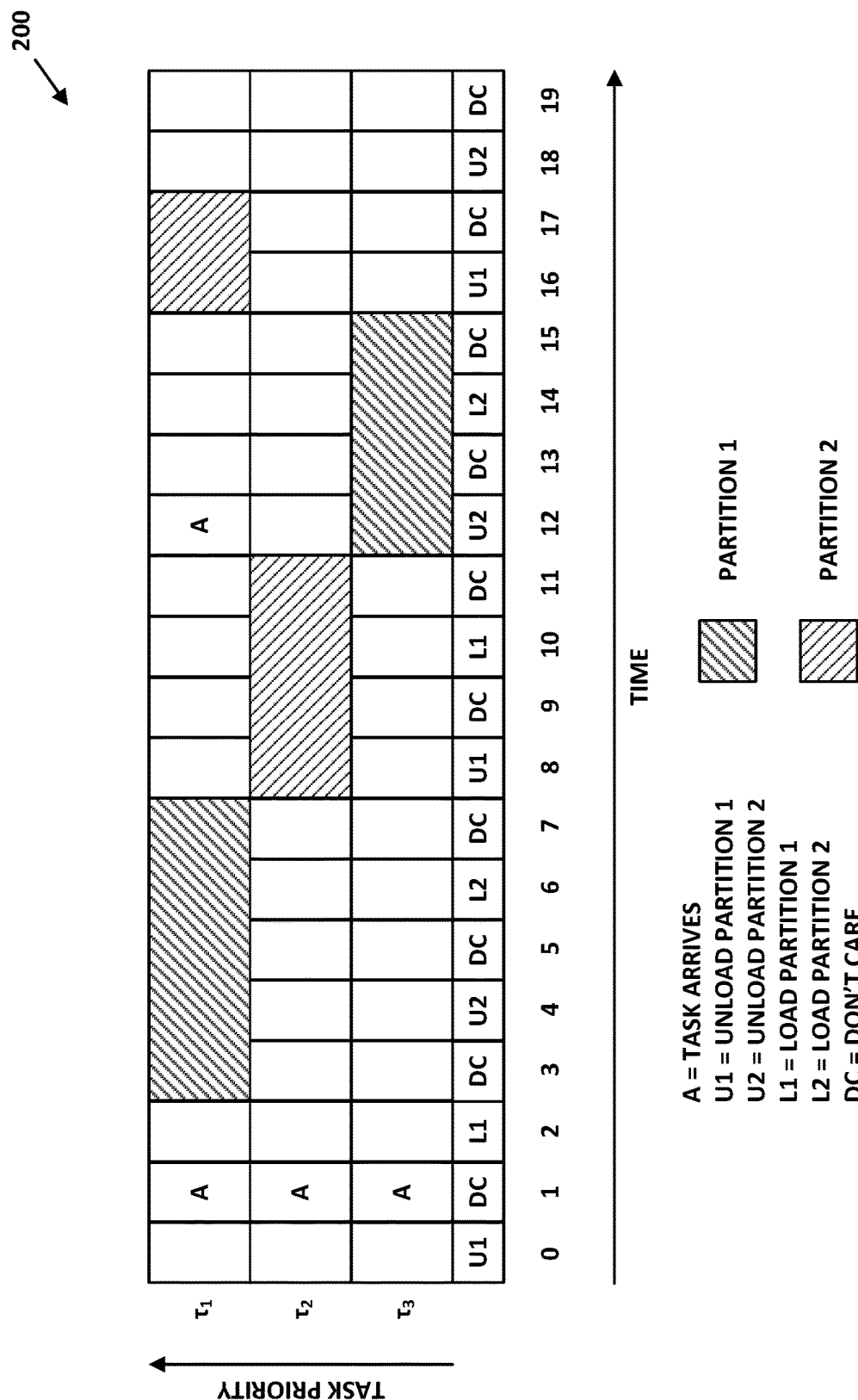
FIG. 2 depicts scheduling core and DMA access to a scratchpad memory, according to an example embodiment.

FIG. 2 depicts scenario 200, which specifies a sequence of operations for a core under analysis and its scratchpad memory. There may be no logical difference between the two scratchpad partitions in this memory. Therefore, tasks may execute from either one of the two, depending on their arrival time and scheduling. One of the partitions may contain the image of the task which is currently being executed, while the other partition may be used to load (or unload) the image of the next (or previous) task to be executed (or that was completed).

Scenario 200 depicts an instance of system 100 with only 2 application cores. Since TDMA scheduling of the DMA engine is considered for this example, only even time slots (0, 2, 4, . . . ) are used by the core under analysis to perform load/unload task phases. Odd slots are marked as "don't care" since they are utilized to perform load/unload operations for tasks scheduled on the other core.

In scenario 200, a set of three tasks, $\{\tau_1, \tau_2, \tau_3\}$, are scheduled on one core that supports two scratchpad partitions. Task $\tau_1$ has a higher priority than task $\tau_2$, which in turn has a higher priority than task $\tau_3$. The scheduling of these tasks is shown across 20 TDMA slots labelled 0 to 19. Note that, in this example, the execution of task $\tau_1$ is broken into two distinct jobs that each "arrive" and are scheduled independently.

When a core is executing one of these tasks or is idle, a DMA engine may perform one of several operations, abbreviated as follows. A U1 operation unloads a task from partition 1—a DMA engine writes the contents of partition 1 of the core's scratchpad memory to main memory, capturing any changes made to partition 1. A U2 operation unloads a task from partition 2—a DMA engine writes the contents of partition 2 of the core's scratchpad memory to main memory, capturing any changes made to partition 2. An L1 operation loads a task into partition 1—a DMA engine writes the tasks executable image and data from main memory to partition 1 of the core's scratchpad memory. An L2 operation loads a task into partition 2—a DMA engine writes the tasks data from main memory to partition 2 of the core's scratchpad memory. A DC (don't care) operation is undefined and may be implemented as the DMA engine remaining idle. A task can only execute after its load operation has been completed and the previous task on the other partition has completed execution. In some embodiments (not shown), tasks may begin or end execution at times that are not on slot boundaries.

In FIG. 2, tasks executing in partition 1 are shown with cross-hatching from the lower left to the upper right, while tasks executing in partition 2 are shown with cross-hatching from the upper left to the lower right. Tasks arrival is denoted with an "A".

In slot 0, no tasks are being executed, and the DMA engine unloads partition 1. In slot 1, no tasks are being executed, but tasks $\tau_1$, $\tau_2$, and $\tau_3$ arrive, and the DMA engine performs a DC operation. In slot 2, no tasks are being executed, but the DMA engine loads partition 1 with task $\tau_1$ (the highest priority task).

In slots 3-7, the core executes task $\tau_1$ in partition 1. While this task is executed, the DMA engine performs a U2 operation to unload partition 2, then performs an L2 operation to load partition 2 with task $\tau_2$.

In slots 8-11, the core executes task $\tau_2$ in partition 2. While this task is executed, the DMA engine performs a U1 operation to unload partition 1. Thus, after task $\tau_1$ completes execution, this U1 operation writes the task's data back to main memory.

In slots 12-15, the core executes task $\tau_3$ in partition 1. While this task is executed, the DMA engine performs a U2 operation to unload partition 2. Thus, after task $\tau_2$ completes execution, this U2 operation writes the task's data back to main memory. In slot 15, the DMA engine also performs an L2 operation to load partition 2 with task $\tau_1$, which once again arrived (was ready for scheduling) at slot 12.

In slots 16-17, the core executes task $\tau_1$ in partition 2. While this task is executed, the DMA engine performs a U1 operation to unload partition 1. Thus, after task $\tau_3$ completes execution, this U1 operation writes the task's data back to main memory. Also, after task $\tau_1$ completes execution, a U2 operation writes the task's data back to main memory.

When a task is executing on a core while a second task is loaded or unloaded in background, the core and the DMA engine may contend for scratchpad access. However, the impact of this contention on the timing of the tasks is typically negligible for two main reasons. First, scratchpad memories are often dual-ported; thus, they are able to support stall-free core and DMA operations. Second, in a system with M cores, core/DMA engine contention over scratchpad memory involves only two entities contending for any one scratchpad memory (e.g., that memory's core and a DMA engine, as opposed to the traditional approach where up to M entities could contend for a main memory.

In general, load and unload operations are scheduled according to two rules, with rule 1 taking precedence over rule 2. Rule 1 is that if a load operation can be performed, a load operation is scheduled to be performed on a DMA engine. Rule 2 is that if a load operation cannot be performed, and there is a previously-executing task to be unloaded, an unload operation is scheduled to be performed on a DMA engine. Rule 1 takes place when: (i) at least one of the two scratchpad memory partitions is available (i.e., has been previously unloaded), and (ii) a task is ready to be loaded. Similarly, rule 2 takes place when: (i) no load can be performed, (ii) at least one partition is not empty, and (iii) the task loaded in a non-empty partition has completed.

In embodiments, the next task to be executed is loaded in background while the executing (foreground) task is not interrupted until its completion. This effectively hides the DMA loading overhead, avoiding contention in main memory and exploiting performance benefits deriving from scratchpad memory usage.

Figure 3:
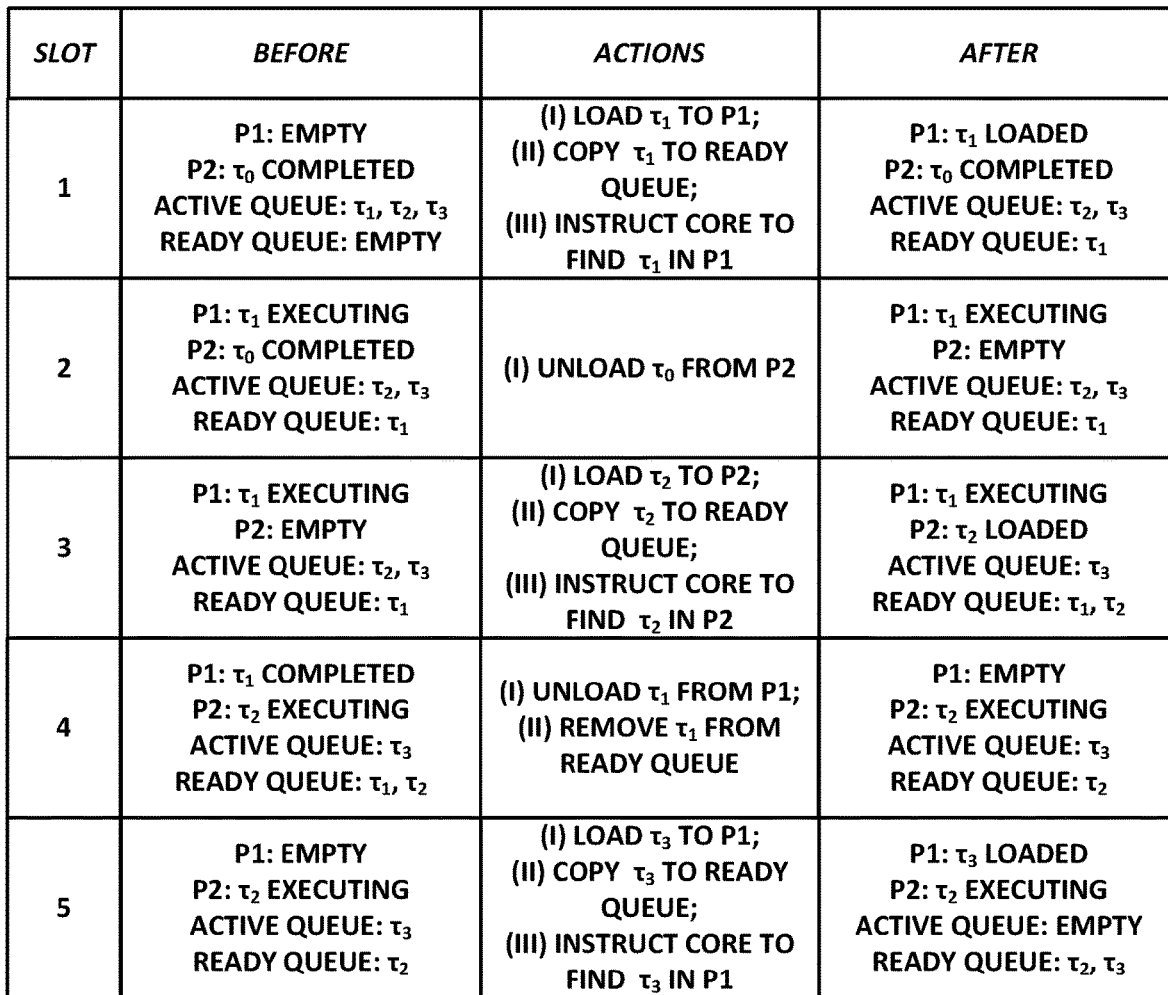
FIG. 3 depicts operations related to execution of applications on a core with a scratchpad memory.
Figure 4:
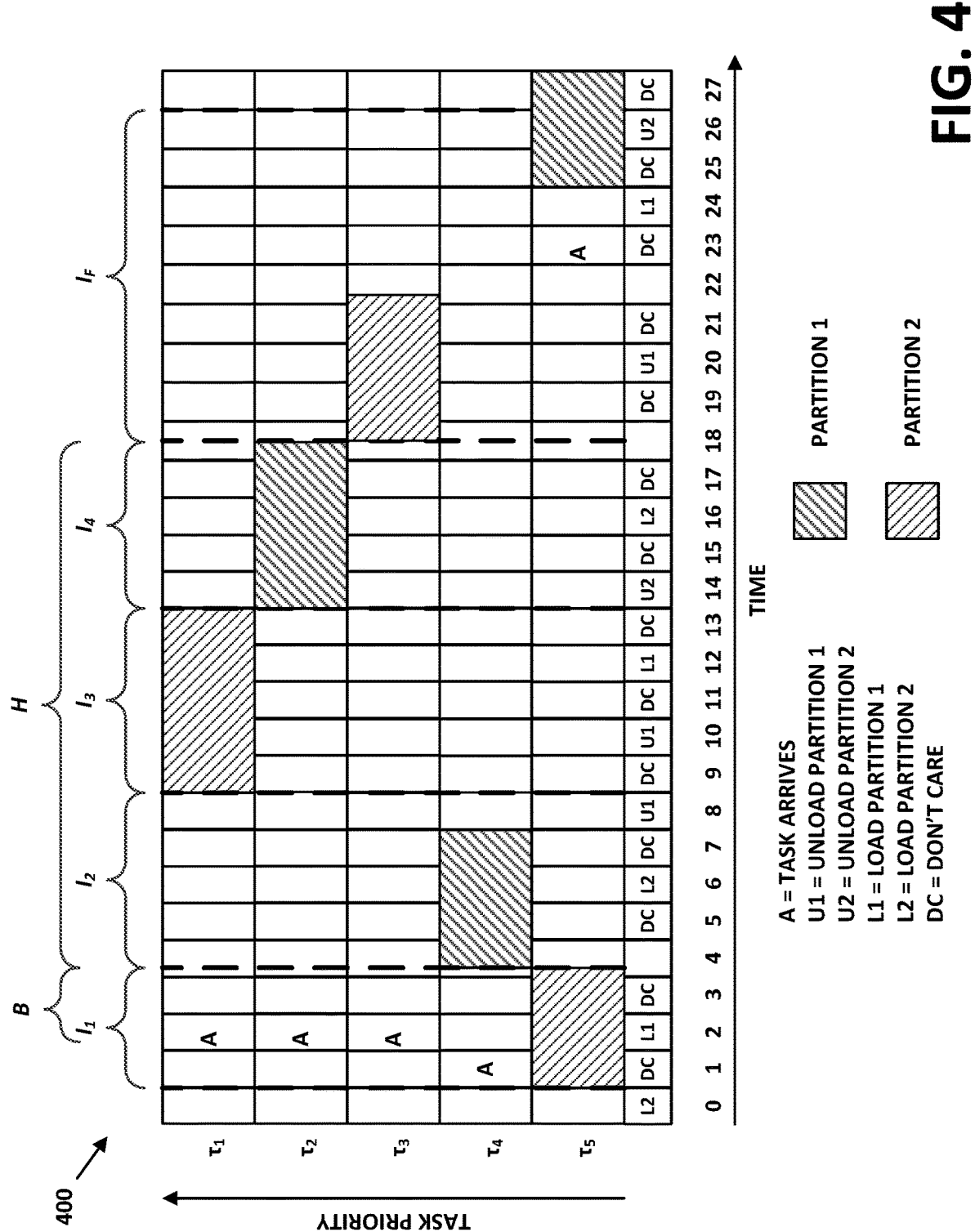
FIG. 4 depicts a schedule of core and DMA access to a scratchpad memory for purpose of performance analysis, according to an example embodiment.
Figure 5A:
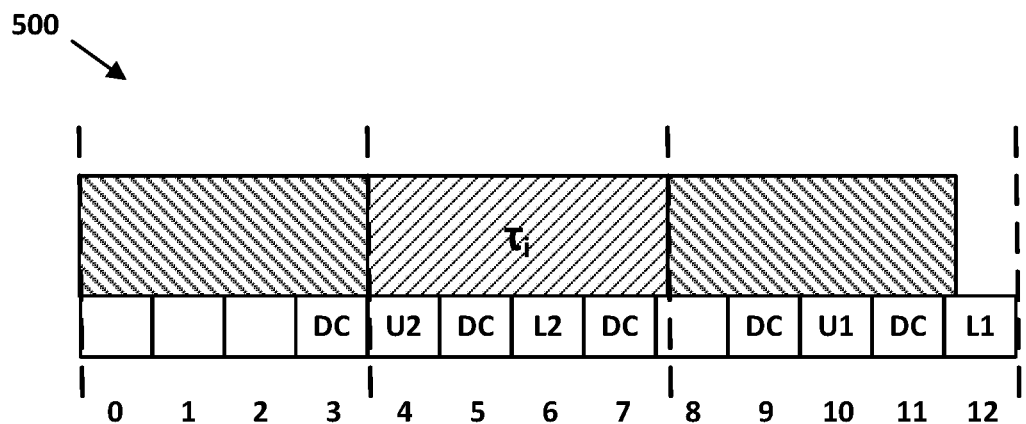
FIG. 5A is a supporting diagram to establish a performance result, according to an example embodiment.
Figure 5B:
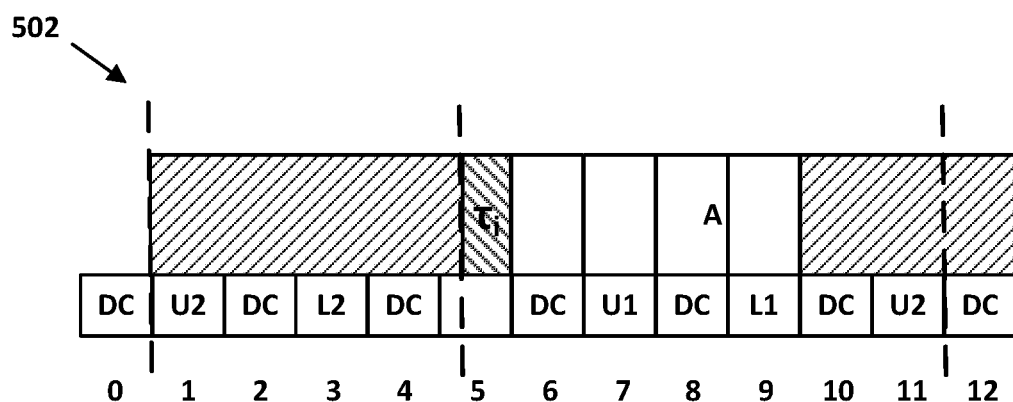
FIG. 5B is a supporting diagram to establish a performance result, according to an example embodiment.

The workflow followed by an application core and the I/O core at the boundary of each TDMA slot is depicted in table 300 of FIG. 3. In table 300, only slots that are assigned to the core under analysis are reported (therefore, there are no "don't care" slots). Specifically, at each time slot, the I/O core checks the status of the queue of active tasks (the active queue) belonging to the application core. If a task that is active for execution but not ready (i.e., not relocated in scratchpad) is found, the I/O core checks if one or more scratchpad memory partitions are empty on the application core. If any partition is found to be empty, the I/O core instructs the DMA engine to load the topmost active task to one of the empty partitions. Once the load is complete, the I/O core updates the active and ready queues associated with the application core. The latter operation allows the application core to begin the execution of the task. Note that since only one task can be in running state on the application, there is always a scratchpad memory partition that is available for load and/or unload operations.

Any of the operations attributed herein to an I/O core could be carried out by any other core or cores. Thus, an application core could perform the operations below.

Particularly, table 300 includes a column specifying slots. Table 300 also contains a column specifying, at the beginning of each slot, the contents of the first partition (P1) and the second partition (P2) of the scratchpad memory, as well the status of the active and ready queues. Table 300 additionally contains a column specifying actions taken during the slot, and a column specifying, at the end of the slot, the contents of partition P1 and partition P2, as well the status of the active and ready queues. The operations in table 300 do not specifically match those of table 200, but may be generated by the same embodiment.

At the beginning of slot 1, partition P1 is empty and partition P2 contains task $\tau_0$, which has completed execution. The active queue contains representations of tasks $\tau_1$, $\tau_2$, and $\tau_3$, while the ready queue is empty. During slot 1, the I/O core loads task $\tau_1$ to partition P1, copies the representation of task $\tau_1$ from the active queue to the ready queue, and instructs the application core to find task $\tau_1$ in partition P1. This latter instruction does not necessarily mean that the application core must immediately begin executing task $\tau_1$, only that the application core is provided an address or context of task $\tau_1$ for later execution thereof.

At the beginning of slot 2, partition P1 contains executing task $\tau_1$ and partition P2 contains task $\tau_0$, which has completed execution. The active queue contains representations of tasks $\tau_2$ and $\tau_3$, while the ready queue contains a representation of task $\tau_1$. During slot 2, the I/O core unloads task $\tau_0$ from partition P2.

At the beginning of slot 3, partition P1 contains executing task $\tau_1$ and partition P2 is empty. The active queue contains representations of tasks $\tau_2$ and $\tau_3$, while the ready queue contains a representation of task $\tau_1$. During slot 3, the I/O core loads task $\tau_2$ to partition P2, copies the representation of task $\tau_2$ from the active queue to the ready queue, and instructs the application core to find task $\tau_2$ in partition P2.

At the beginning of slot 4, partition P1 contains task $\tau_1$, which has completed execution, and partition P2 contains executing task $\tau_2$. The active queue contains a representation of task $\tau_3$, while the ready queue contains representations of tasks $\tau_1$ and $\tau_2$. During slot 4, the I/O core unloads task $\tau_1$ from partition P1, and removes the representation of task $\tau_1$ from the ready queue.

At the beginning of slot 5, partition P1 is empty and partition P2 contains executing task $\tau_2$. The active queue contains a representation of task $\tau_3$, while the ready queue contains a representation of task $\tau_2$. During slot 5, the I/O core loads task $\tau_3$ to partition P1, copies the representation of task $\tau_3$ from the active queue to the ready queue, and instructs the application core to find task $\tau_3$ in partition P1. At the end of slot 5, partition P1 contains task $\tau_3$ and partition P2 contains executing task $\tau_2$. The active queue is empty and the ready queue contains representations of tasks $\tau_2$ and $\tau_3$.

In view of the example depicted in FIG. 3, the embodiments herein enforce a separation between task execution and the asynchronous activity of I/O peripherals. This goal is achieved by offering to tasks a synchronous view of I/O data that distinguishes between data production and dispatch of data to and/or from tasks. In fact, I/O data flows between the I/O subsystem and tasks only at the boundary of load or unload operations.

As mentioned above, a dedicated bus may connect the scratchpad memory of the I/O core with peripherals. Hence, asynchronous peripheral traffic can reach the I/O subsystem without interfering with task execution. For each device used in the proposed system, the operating system may define a statically positioned device buffer on the I/O core scratchpad. A device buffer is further divided into an input device buffer and an output device buffer. The input (output) device buffer represents the position in memory where data produced by devices (tasks) is accumulated before being dispatched to tasks (devices).

Peripheral drivers can operate with an interrupt-driven or polling mechanism. For DMA-capable peripherals supporting interrupt-driven interaction, the driver may specify the address of the device buffer from/to where data is transferred. The driver may also be responsible for updating device-specific buffer pointers to prevent a subsequent data event from overwriting unprocessed data. For interrupt-driven interaction with non-DMA-capable devices, the driver may use the platform peripheral DMA to perform data movement. Similarly, the device driver may be periodically activated, and the peripheral DMA may be used to perform data transfer for polling-based interaction with devices.

In general, device-originated interrupts as well as timer interrupts for device driver activations are prioritized according to the criticality of the interaction with the considered device. Nonetheless, the device-related events may be served with priority levels that are lower than task-scheduling events such as TDMA slot timer events and completion of DMA loads or unloads of tasks.

In order to interface with a peripheral, tasks may define subscriptions to I/O flows. A subscription represents an association between a task and a stream of data at an I/O device. For instance, a given task could subscribe for all the packets arriving at a network interface with a specific source address prefix. Task subscriptions are metadata that are stored within the task descriptor. Task subscriptions to data streams can be defined offline as part of the system configuration, or established at runtime via an operating-system-defined interface.

For each task in the system, a pair of buffers (for input and output respectively) is defined on the scratchpad memory of the I/O core to temporarily store data belonging to subscribed streams. Since the content of these buffers will be copied to/from the cores upon task load/unload, they are referred to as task mirror buffers.

Consider the arrival of I/O data from a device. As soon as the interaction with the driver is completed, the arrived data is present in the corresponding device buffer. According to task subscriptions, the operating system is responsible for copying the input data to all the mirror buffers of those tasks subscribed to the flow.

The advantage of defining mirror buffers is that when a task is to be loaded, all the peripheral data that is to be provided are clustered in a single memory range. Consequently, during the loading phase of a task, the DMA engine is programmed to copy the content of the mirror input buffer together with task code and data images to the application core. The reverse path is followed by task-produced output data during the task unload phase.

Since I/O data are delivered to application tasks at or near the boundary of load/unload operations, the approach presented below for the calculation of tasks' response time can be reused to reason about end-to-end delay of I/O-related events.

3. IMPLEMENTATION

This section provides the details of a scratchpad memory OS implemented using a COTS platform that supports the hardware assumptions described above. The description within this section provides just one set of possible implementations. Other example implementations are possible.

A. Architectural Overview of the Platform

TABLE 1

| | |
|---|---|
| Chip | MPC5777M (Matterhorn) |
| Manufacturer | FREESCALE ® |
| Architecture | Power-PC 32-bit |
| CPU | 2x E200-Z710 + 1x E200-Z709 + 1x E200-Z425 (I/O) |
| Processing Unit | CPUs, DMA, Interrupt Controller, NIC |
| Operational Modes | Parallel + Lockstep (on one application core) |
| ECC Protection | Cache, RAM, Flash Storage |
| Cache Hierarchy | L1 (Private Instructions + Data) + Local (Scratchpad) Memory |
| Scratchpad Memory Size | Instructions (16 KB) + Data (64 KB) each |
| L1 Cache Size | Instructions (16 KB) + Data (4 KB) each |
| SRAM Size | 404 KB |
| Flash Size | 8 MB |
| Main Peripherals | Ethernet, Flex Ray, CAN, I2C, SIUL |

A FREESCALE® MPC5777M micro-controller unit (MCU) was used for the implementation. This MCU is the most advanced system-on-a-chip in the MPC line as of the fourth quarter of 2015. A brief summary of the architectural features of the MPC5777M MCU is provided in Table 1. The chip includes four processors: two E200-Z710 application cores operating at 300 MHz and a single E200-Z425 I/O core. An additional non-programmable core is included for delayed lockstep operation. Each core features private, globally accessible scratchpad memories for instructions and data, with sizes of 16 KB and 64 KB, respectively. No MMU is available on this platform—thus, there is no support for virtual memory. Application cores can directly access the SRAM through a dedicated bus. A separate and slower bus is dedicated for transferring peripheral data to/from the I/O core.

B. Operating System Implementation Using Erika Enterprise

The proposed scratchpad-centric operating system was implemented using Evidence Erika Enterprise. Erika Enterprise is an open-source real-time operating system (RTOS) that is compliant with the AUTOSAR (Automotive Open System Architecture) standard for automotive architectures providing a basic infrastructure for vehicular software. Erika Enterprise features a small memory footprint, supports multi-core platforms and implements common scheduling policies for periodic tasks. The embodiments herein involved porting of Erika Enterprise on the MPC5777M MCU, adding support for a UART communication interface, an interrupt controller, caches, an MPU, data engines (DMA), and an Ethernet controller.

In order to implement a scratchpad-centric operating system, Erika Enterprise was further augmented to support position-independent (relocatable) tasks. Compilers were provided for far-data and far-code addressing modes. In this way, tasks can be compiled to perform program-counter-relative jumps and indirect data addressing with respect to an OS-managed base register. The default task loader was extended to exploit DMA for transferring task images from SRAM to local memories and vice-versa. Similarly, the scheduler was adapted to implement the strategy discussed above.

In Erika Enterprise, tasks are compiled and linked directly inside the image of the operating system. For each task in the system, Erika-specific metadata is defined. Additionally, metadata that extend the task descriptors for scratchpad-centric operations is used. Manually configuring these parameters can be tedious and error-prone. Therefore, an operating system configurator tool was developed. This tool uses high-level task definitions and generates the final configuration for scratchpad-centric operating system. Specifically, each core is associated with a set of configuration files that describe the number of tasks, their priority, task entry points, initial statuses, and so on. When a task is added, these files are edited accordingly.

Particularly, the body of all the tasks is placed in an ad-hoc file. Similarly, task-specific data that is to be preserved across activations are defined in different files and surrounded with appropriate compiler-specific PRAGMA directives. This allows the following desirable characteristics: (i) a specific linker section is used to store task code and data images, and (ii) position-independent data and instructions are generated. A separate file also defines the relocatable task table, which stores the status of each relocatable task. This structure includes: (i) the position in SRAM of the task code and data images, (ii) the position of the task's I/O data buffers, (iii) current status of the task (e.g. loaded, completed, unloaded), and (iv) the scratchpad memory partition of last relocation.

C. Evaluation

To validate the proposed design and implementation, a series of experiments were performed, with results summarized in this section.

i. Overhead Evaluation

A parameter of the proposed system is TDMA slot size. This should be long enough to allow the completion of a load (or unload) operation for the task with the largest footprint in the system. However, in order to derive an upper bound, it is assumed that a task footprint is constrained by the size of a partition. Thus, the slot size is based on DMA load/unload measurements. The DMA setup time is how long it takes a DMA engine to be programmed, by the I/O core, to perform a DMA operation. The context switch time is how long the operating system schedule takes to switch from executing one task to executing another. These empirical measurements are reported in Table 2.

TABLE 2

| Parameter | Time in microseconds |
|---|---|
| Partition load | 432 |
| Partition unload | 432 |
| DMA setup | 3.16 |
| Context switch | 0.46 | ii. Results of Achievable I/O Bandwidth

The performance of the proposed I/O subsystem depends on the frequency of load/unload operations. In order to measure the achievable I/O bandwidth of the proposed design, support for the onboard Fast Ethernet Controller (FEC) was developed. The FEC is capable of transmitting data at the highest bandwidth among all the devices of the considered MCU. Hence, it represents the best I/O component to stress-test our design.

The FEC was connected to an external node which generates constant-rate traffic. Specifically, the traffic source generates a 1 KB packet every 100 microseconds, which is rate of 1000 Hz, or about 82 Mb/s). The payload of each packet contains a flow-ID chosen from 4 different values in round-robin. On used MCU, each application core runs two tasks that have subscribed to I/O data flows based on packets' flow-IDs. Device buffers and task (mirror) I/O buffers have been dimensioned to accommodate a single packet per task, with an overwrite policy.

With this setup, the raw achievable bandwidth was determined using two different slot sizes. Particularly, experiments revealed an achievable bandwidth for the outgoing traffic of 4 Mb/s with a slots size of 800 microseconds, and 8 Mb/s with a slot size of 400 microseconds. Although this represents a fraction of the physically available bandwidth (100 Mb/s), being able to sustain a bandwidth higher than 1 Mb/s constitutes a promising result given that the platform operates at a clock frequency of few hundred Hz.

iii. Results of Synthetic Benchmarks

Figure 6:
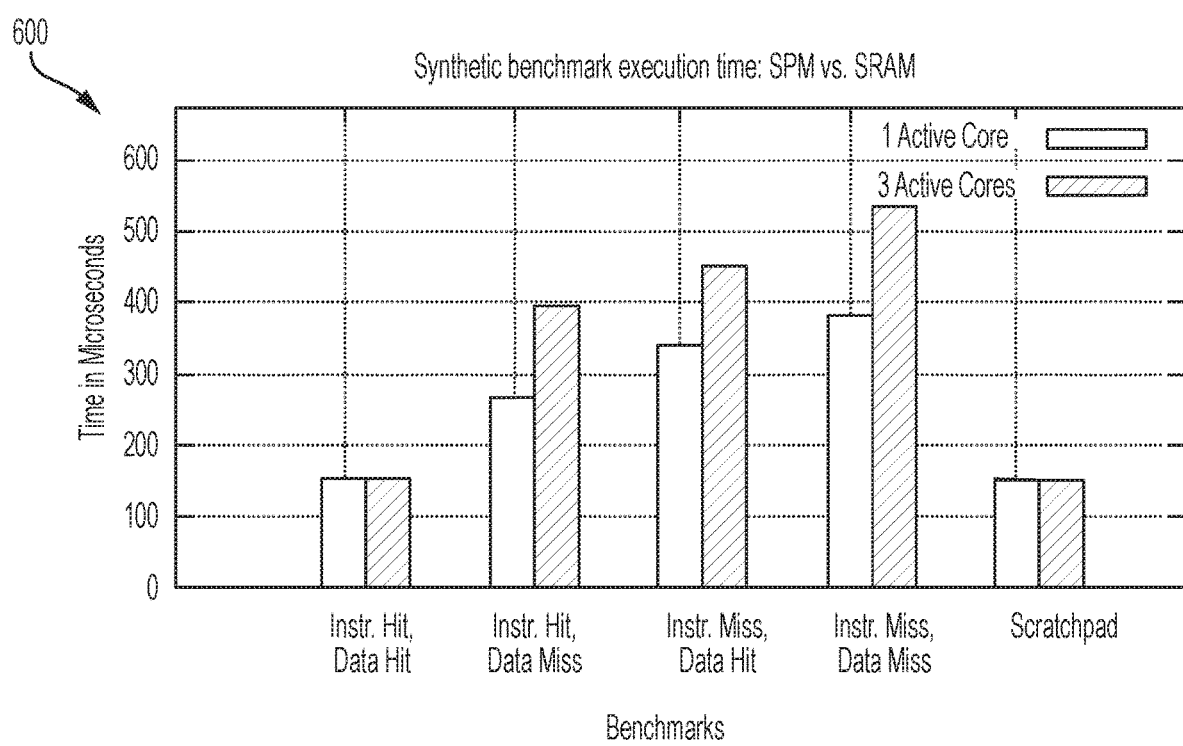
FIG. 6 is a chart of performance results comparing the embodiments herein to a traditionally-arranged system.

The performance of scratchpad-based execution was compared to a traditional execution model. For this purpose, a set of synthetic benchmarks that exhibit different memory access patterns were developed. FIG. 6 depicts the execution time for such benchmarks on one of the two application cores. In this Figure, as well as FIGS. 7 and 8, "SPM" refers to the scratchpad memory embodiments described herein, while "SRAM" refers to conventional contention-based single-memory implementations.

The first cluster of bars refers to the execution time of the benchmark that exhibits good data locality. Hence, when it is executed from SRAM, caches are effective at hiding SRAM access latency and significantly reduce task execution time. The next two clusters of bars show that misses suffered for only instruction fetches or only data fetches already induce a significant execution slowdown (around 2×). The need for accessing SRAM data also introduces runtime fluctuation (about 25%) as a result of inter-core interference. Such an effect becomes even more severe with application code that experiences misses while accessing both instructions and data. If the cost of accessing SRAM memory together with the slowdown due to inter-core interference are considered, an overall 3.5× slowdown is experienced when compared to what has been observed in the ideal case (100% cache hits). Finally, if a task is able to entirely execute from scratchpad, its execution time is comparable to the ideal case and inter-core interference is prevented. These results are a strong motivation to best use available scratchpads in order to improve performance and avoid inter-core interference.

iv. Results of EEMBC Benchmarks

Figure 7:
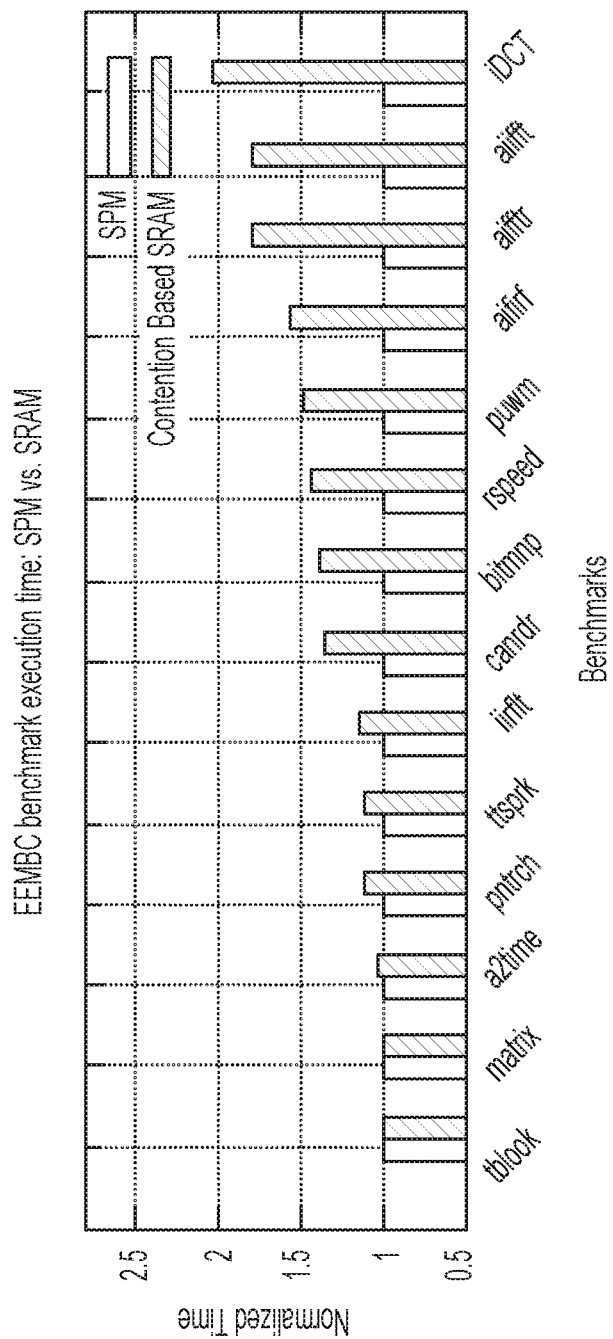
FIG. 7 is another chart of performance results comparing the embodiments herein to a traditionally-arranged system.

Next, the behavior of Embedded Microprocessor Benchmark Consortium (EEMBC) benchmarks is investigated on the selected platform. For this purpose, the execution time of the full suite of automotive EEMBC benchmarks were measured under two scenarios: traditional contention-based execution from SRAM, and the proposed scratchpad-based execution. The results of normalized execution times are shown in FIG. 7. From the results, computation intensive benchmarks do not benefit from scratchpad-based execution. Conversely, for memory-intensive benchmarks scratchpad-based execution results in substantial speed-ups (up to 2.1×).

TABLE 3

| Benchmark | Scratchpad Time (microseconds) | SRAM Time (microseconds) | Code Size (bytes) | Relocatable Code Size (bytes) | Data Size (bytes) |
|---|---|---|---|---|---|
| tblook | 1013 | 1015 | 1804 | 1892 | 10516 |
| matrix | 1053 | 1054 | 4430 | 4774 | 4488 |
| a2time | 1002 | 1029 | 2175 | 2538 | 1704 |
| pntrch | 1036 | 1145 | 1000 | 1398 | 4924 |
| ttsprk | 383 | 425 | 4124 | 4772 | 8160 |
| iirflt | 1040 | 1189 | 3288 | 3512 | 1000 |
| canrdr | 1009 | 1359 | 1370 | 1562 | 12440 |

TABLE 3-continued

| Bench-mark | Scratchpad Time (microseconds) | SRAM Time (microseconds) | Code Size (bytes) | Relocatable Code Size (bytes) | Data Size (bytes) |
|---|---|---|---|---|---|
| bitmnp | 990 | 1389 | 3152 | 3282 | 1116 |
| rspeed | 1012 | 1457 | 710 | 1208 | 13212 |
| puwm | 1036 | 1540 | 1716 | 2500 | 2412 |
| aifirf | 1005 | 1564 | 1554 | 2286 | 1552 |
| aifftr | 916 | 1642 | 3720 | 4458 | 8448 |
| aiifft | 1170 | 2092 | 2796 | 3540 | 9224 |
| idct | 1045 | 2126 | 4498 | 4690 | 244 |

Table 3 shows the execution time of the full suite of EEMBC automotive benchmarks. Furthermore, Table 3 also provides the footprint size of the considered benchmarks. All of the considered benchmarks fit into a single scratchpad partition. These results validate the applicability of the proposed design in real scenarios.

v. Schedulability Analysis

To further demonstrate the extent of the technical improvement to real-time operating systems that these embodiments provide, we compare the system described herein to an unregulated system in terms of task set schedulability. The unregulated system uses caches, and cores are allowed to access main memory at any time; hence, the execution time of tasks is increased due to contention. For this evaluation, the applications in Table 3 were used to generate a set of synthetic tasks with varying utilization. Periods were randomly generated between 10 and 100 ms. To model the effects of contention, we considered the execution times reported in the SRAM Time column in Table 3. The overheads in Table 2 (DMA setup and context-switching) were also considered in the execution time of the tasks. The response time analysis method described in the following references: (1), (2), was used to determine response time bounds for the system described herein, while standard response time for a fixed-priority non-preemptive system was used for the unregulated system. A task is deemed schedulable if its response time is less than or equal to its deadline, which was set equal to its period. (1) Saud Wasly and Rodolfo Pellizzoni: Hiding Memory Latency Using Fixed Priority Scheduling. Proceedings of the 20th IEEE Real-Time and Embedded Technology and Applications Symposium (RTAS), April 2014, Berlin, Germany. (2) Rohan Tabish, Renato Mancuso, Saud Wasly, Ahmed Alhammad, Sujit S. Phatak, Rodolfo Pellizzoni and Marco Caccamo: A Real-Time Scratchpad-centric OS for Multi-core Embedded Systems. Proceedings of the 22nd IEEE Real-Time and Embedded Technology and Applications Symposium (RTAS), April 2016, Vienna, Austria.

Figure 8:
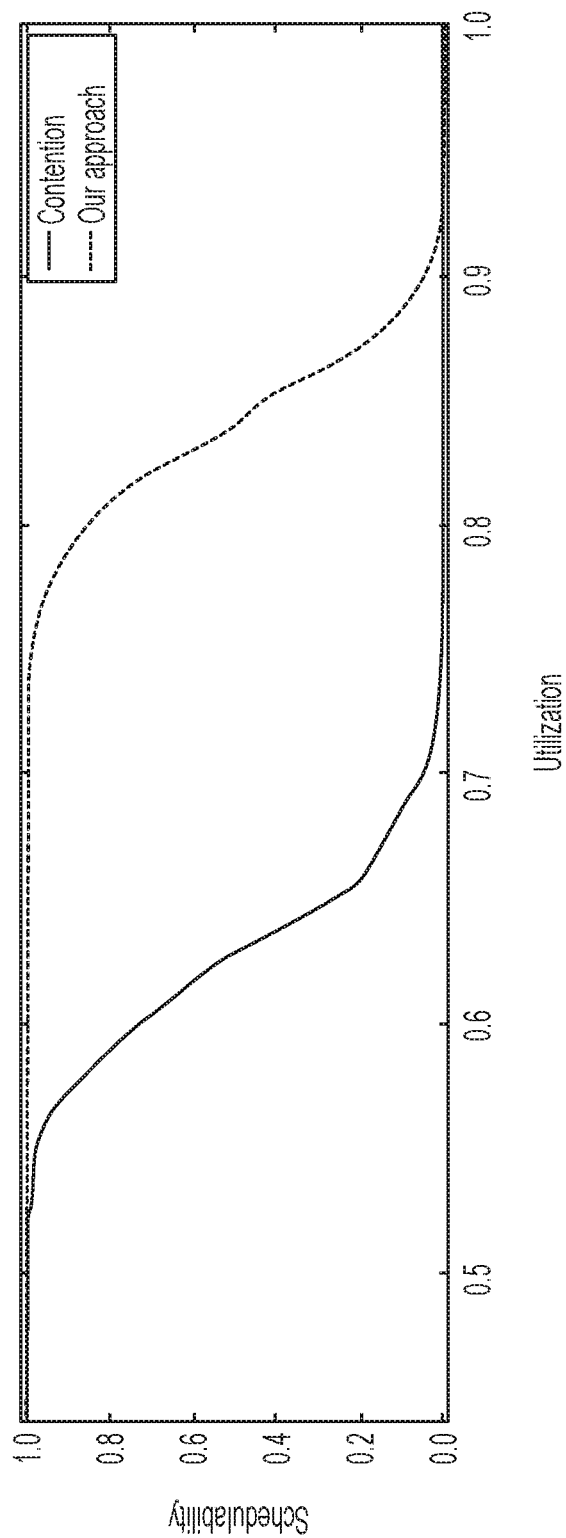
FIG. 8 is a graph of performance results comparing the embodiments herein to a traditionally-arranged system.

FIG. 8, reproduced from reference (2), shows the results in terms of ratio of schedulable task sets for both the system described herein and the unregulated system. The results show that system schedulability increases significantly when employing the method described herein. Hence, the proposed scratchpad-centric operating system is effective in both improving the predictability of task execution, and increasing the utilization of system resources.

4. EXAMPLE OPERATIONS

Figure 9:
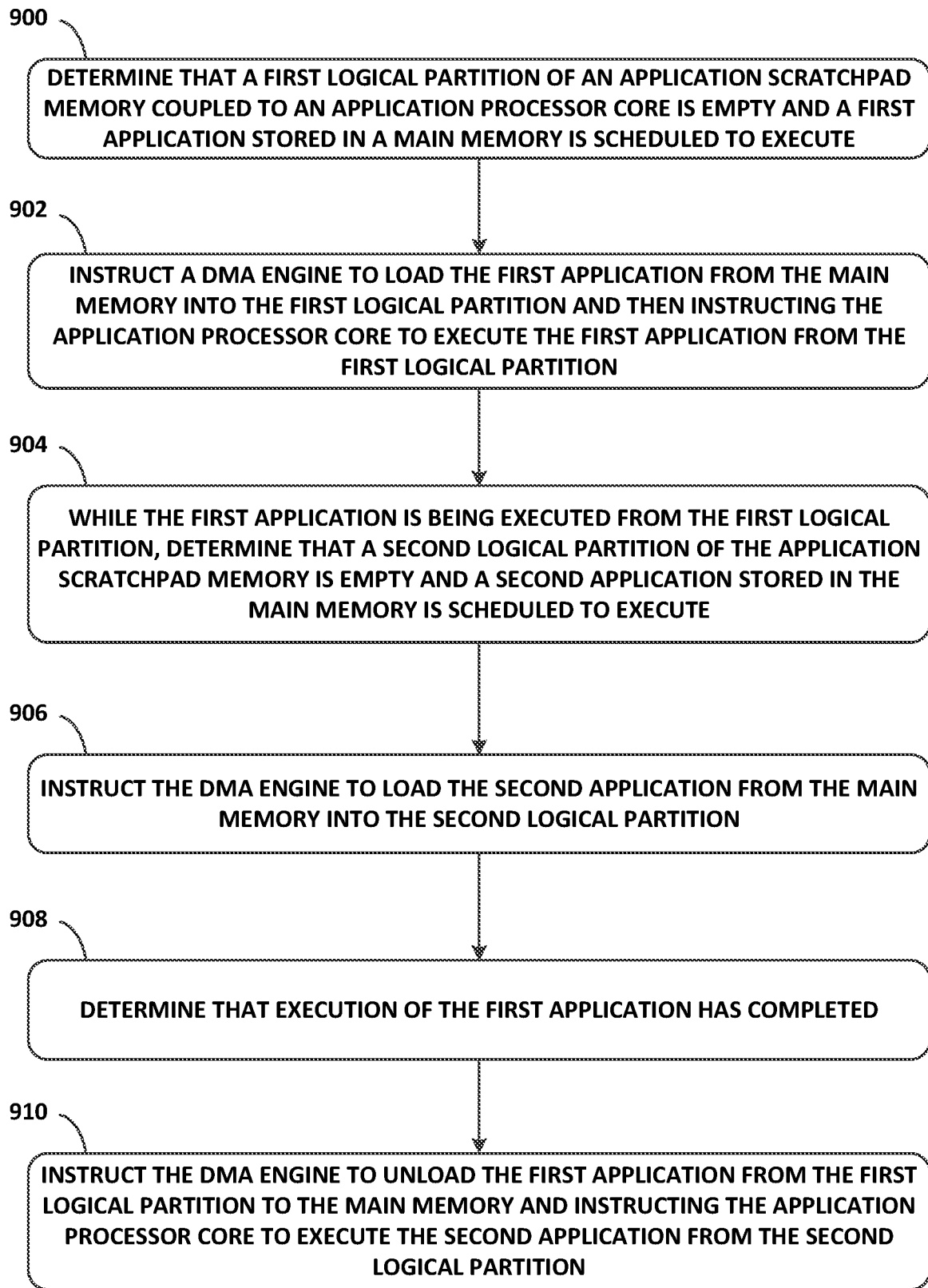
FIG. 9 depicts a flow chart, according to an example embodiment.

FIG. 9 is a flow chart illustrating an example embodiment. The process illustrated by FIG. 9 may be carried out by an operating system or software arrangement executing on a computing system such as the computing system of FIG. 1. However, the process can be carried out by other types of hardware or software systems.

Specifically, a computing system arranged may include an application processor core coupled to an application scratchpad memory and configured to execute applications stored in the application scratchpad memory. In some embodiments, the application scratchpad memory is dual ported.

The computing system may further include a main memory, DMA engine, and a data bus communicatively connecting the application processor core, the application scratchpad memory, the main memory, and the DMA engine. An operating system configured to execute on the computing system may perform the operations of FIG. 9.

Block 900 may involve determining that a first logical partition of the application scratchpad memory is empty and a first application stored in the main memory is scheduled to execute.

Block 902 may involve, possibly in response to determining that the first logical partition of the application scratchpad memory is empty and the first application stored in the main memory is scheduled to execute, instructing the DMA engine to load the first application from the main memory into the first logical partition and then instructing the application processor core to execute the first application from the first logical partition.

Block 904 may involve, while the first application is being executed from the first logical partition, determining that a second logical partition of the application scratchpad memory is empty and a second application stored in the main memory is scheduled to execute.

Block 906 may involve, possibly in response to determining that the second logical partition of the application scratchpad memory is empty and the second application is scheduled to execute, instructing the DMA engine to load the second application from the main memory into the second logical partition.

Block 908 may involve determining that execution of the first application has completed.

Block 910 may involve, possibly in response to determining that execution of the first application has completed, instructing the DMA engine to unload the first application from the first logical partition to the main memory and instructing the application processor core to execute the second application from the second logical partition.

In some embodiments, unloading an application from a logical partition of the application scratchpad memory empties the logical partition.

In some embodiments, the computing system may further include one or more peripheral components, and an I/O processor core coupled to an I/O scratchpad memory. The I/O processor core may be configured to coordinate the scheduling and transfer of data between the main memory and the I/O scratchpad memory, and between the I/O scratchpad memory and the one or more peripherals. The one or more peripheral components, the I/O processor core, the I/O scratchpad memory, and the DMA engine may be communicatively coupled by an I/O bus.

In some embodiments, the first application has higher priority than the second application. Accordingly, instructing the DMA engine to load the first application from the main memory into the first logical partition may also occur because the first application has higher priority than the second application.

In some embodiments, the application scratchpad memory contains an active queue and a ready queue for applications. Thus, prior to determining that the first logical partition of the application scratchpad memory is empty and the first application is scheduled to execute, it may be determined that the active queue contains representations of the first application and the second application, and the ready queue is empty. Furthermore, instructing the DMA engine to load the first application from the main memory into the first logical partition may involve copying the representation of the first application from the active queue to the ready queue. Moreover, instructing the DMA engine to unload the first application from the first logical partition to the main memory may involve removing the first application from the ready queue.

In some embodiments, operations that load applications from the main memory to empty partitions of the application scratchpad memory have precedence over operations that unload applications to the main memory from the application scratchpad memory.

In some embodiments, the operations further include: while the second application is being executed from the second logical partition, determining that the first logical partition of the application scratchpad memory is empty and a third application stored in the main memory is scheduled to execute; and possibly in response to determining that the first logical partition of the application scratchpad memory is empty and the third application is scheduled to execute, instructing the DMA engine to load the third application from the main memory into the first logical partition.

The embodiments of FIG. 9 may be simplified by the removal of any one or more of the features shown therein. Further, these embodiments may be combined with features, aspects, and/or implementations of any of the previous figures or otherwise described herein.

5. ADDITIONAL VARIATIONS

The embodiments herein may be modified in various ways. For instance, a task could be divided into three parts: (i) a core executing initialization of a graphics processing unit (GPU) kernel, (ii) execution of the GPU kernel, and (iii) the core finalizing the results of the GPU kernel execution. These phases are similar to the load/execute/unload phases described above. But unlike the previously-described embodiments, where the two resources being managed are the core and the scratchpad memory, in this example the two resources are the core and the GPU.

Furthermore, the embodiments herein could be implemented on a hypervisor (or virtual machine monitor) system to control the scheduling of tasks across or within virtual machines. This may include the creation and/or removal of new virtual machines as needed. Thus, the hypervisor may control a plurality of such virtual machines, each roughly analogous to a core and its scratchpad memory as described above.

6. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The above detailed description describes various features and functions of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages can be executed out of order from that shown or discussed, including substantially concurrent or in reverse order, depending on the functionality involved. Further, more or fewer blocks and/or functions can be used with any of the ladder diagrams, scenarios, and flow charts discussed herein, and these ladder diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computing system comprising:
an application processor core coupled to an application scratchpad memory and configured to execute applications stored in the application scratchpad memory;
a main memory;
a direct memory access (DMA) engine;
one or more peripheral components;
an input/output (I/O) processor core coupled to an I/O scratchpad memory and configured to coordinate scheduling and transfer of data between the main memory and the I/O scratchpad memory, and between the I/O scratchpad memory and the one or more peripheral components; and
an operating system configured to execute on the computing system and perform operations comprising:
determining that a first logical partition of the application scratchpad memory is empty and a first application stored in the main memory is scheduled to execute;
instructing the DMA engine to load the first application from the main memory into the first logical partition and instructing the application processor core to execute the first application from the first logical partition;
while the first application is being executed from the first logical partition, determining that a second logical partition of the application scratchpad memory is empty and a second application stored in the main memory is scheduled to execute;
instructing the DMA engine to load the second application from the main memory into the second logical partition;
determining that execution of the first application has completed; and
instructing the DMA engine to unload the first application from the first logical partition to the main memory and instructing the application processor core to execute the second application from the second logical partition.

2. The computing system of claim 1, wherein unloading an application from a logical partition of the application scratchpad memory empties the logical partition.

3. The computing system of claim 1, wherein the application processor core, the application scratchpad memory, the main memory, and the DMA engine are communicatively coupled by a data bus, and wherein the one or more peripheral components, the I/O processor core, the I/O scratchpad memory, and the DMA engine are communicatively coupled by an I/O bus.

4. The computing system of claim 1, wherein the first application has higher priority than the second application, and wherein instructing the DMA engine to load the first application from the main memory into the first logical partition also occurs because the first application has higher priority than the second application.

5. The computing system of claim 1, wherein the application scratchpad memory is dual ported.

6. The computing system of claim 1, wherein the application scratchpad memory contains an active queue and a ready queue for applications.

7. The computing system of claim 6, the operations further comprising:
prior to determining that the first logical partition of the application scratchpad memory is empty and the first application is scheduled to execute, determining that the active queue contains representations of the first application and the second application, and the ready queue is empty.

8. The computing system of claim 7, wherein instructing the DMA engine to load the first application from the main memory into the first logical partition comprises copying the representation of the first application from the active queue to the ready queue.

9. The computing system of claim 8, wherein instructing the DMA engine to unload the first application from the first logical partition to the main memory comprises removing the first application from the ready queue.

10. The computing system of claim 1, wherein operations that load applications from the main memory to empty partitions of the application scratchpad memory have precedence over operations that unload applications to the main memory from the application scratchpad memory.

11. The computing system of claim 1, wherein the operations further comprise:
while the second application is being executed from the second logical partition, determining that the first logical partition of the application scratchpad memory is empty and a third application stored in the main memory is scheduled to execute; and
instructing the DMA engine to load the third application from the main memory into the first logical partition.

12. A computing system comprising:
an application processor core coupled to an application scratchpad memory and configured to execute applications stored in the application scratchpad memory, wherein the application scratchpad memory contains an active queue and a ready queue for applications;
a main memory;
a direct memory access (DMA) engine; and
an operating system configured to execute on the computing system and perform operations comprising:
determining that a first logical partition of the application scratchpad memory is empty and a first application stored in the main memory is represented in the active queue;
instructing the DMA engine to load the first application from the main memory into the first logical partition and instructing the application processor core to execute the first application from the first logical partition;
while the first application is being executed from the first logical partition, determining that a second logical partition of the application scratchpad memory is empty and a second application stored in the main memory is represented in the active queue;
instructing the DMA engine to load the second application from the main memory into the second logical partition;
determining that execution of the first application has completed; and
instructing the DMA engine to unload the first application from the first logical partition to the main memory and instructing the application processor core to execute the second application from the second logical partition.

13. The computing system of claim 12, the operations further comprising:
prior to determining that the first logical partition of the application scratchpad memory is empty and the first application is scheduled to execute, determining that the active queue contains representations of the first application and the second application, and the ready queue is empty.

14. The computing system of claim 13, wherein instructing the DMA engine to load the first application from the main memory into the first logical partition comprises copying the representation of the first application from the active queue to the ready queue.

15. The computing system of claim 14, wherein instructing the DMA engine to unload the first application from the first logical partition to the main memory comprises removing the first application from the ready queue.

16. The computing system of claim 12, further comprising:
one or more peripheral components; and
an input/output (I/O) processor core coupled to an I/O scratchpad memory and configured to coordinate scheduling and transfer of data between the main memory and the I/O scratchpad memory, and between the I/O scratchpad memory and the one or more peripheral components.

17. A method comprising:
determining that a first logical partition of an application scratchpad memory is empty and a first application stored in a main memory is represented in an active queue, wherein the application scratchpad memory contains the active queue and a ready queue for applications;
instructing a direct memory access (DMA) engine to load the first application from the main memory into the first logical partition and instructing an application processor core to execute the first application from the first logical partition;
while the first application is being executed from the first logical partition, determining that a second logical partition of the application scratchpad memory is empty and a second application stored in the main memory is represented in the active queue;
instructing the DMA engine to load the second application from the main memory into the second logical partition;
determining that execution of the first application has completed; and
instructing the DMA engine to unload the first application from the first logical partition to the main memory and instructing the application processor core to execute the second application from the second logical partition.

18. The method of claim 17, further comprising:
prior to determining that the first logical partition of the application scratchpad memory is empty and the first application is scheduled to execute, determining that the active queue contains representations of the first application and the second application, and the ready queue is empty.

19. The method of claim 18, wherein instructing the DMA engine to load the first application from the main memory into the first logical partition comprises copying the representation of the first application from the active queue to the ready queue.

20. The method of claim 19, wherein instructing the DMA engine to unload the first application from the first logical partition to the main memory comprises removing the first application from the ready queue.

* * * * *